(12) United States Patent
Hekal

(10) Patent No.: US 6,852,783 B2
(45) Date of Patent: Feb. 8, 2005

(54) INTERCONNECTING CHANNEL MORPHOLOGY COMPOSITION FOR RELEASING $CO_2$

(75) Inventor: Ihab Hekal, Greenwich, CT (US)

(73) Assignee: CSP Technologies, Inc., Amstersam, NY (US)

( * ) Notice: Subject to any disclaimer, the term of this patent is extended or adjusted under 35 U.S.C. 154(b) by 579 days.

(21) Appl. No.: 10/033,973

(22) Filed: Dec. 19, 2001

(65) Prior Publication Data

US 2002/0173572 A1 Nov. 21, 2002

Related U.S. Application Data

(60) Provisional application No. 60/256,677, filed on Dec. 19, 2000.

(51) Int. Cl.[7] .................................................. C08K 3/00
(52) U.S. Cl. ....................... 524/320; 524/321; 524/424; 524/425; 524/427
(58) Field of Search ............................... 524/320, 321, 524/424, 425, 427

(56) References Cited

U.S. PATENT DOCUMENTS 5,611,962 A * 3/1997 Garcia et al. ............... 524/320

6,740,731 B2 * 5/2004 Bigg et al. .................. 528/354

* cited by examiner

Primary Examiner—Edward J. Cain
(74) Attorney, Agent, or Firm—Greenberg Traurig, LLP

(57) ABSTRACT

A $CO_2$ releasing composition that can be incorporated into the packaging for carbonated beverages having a co-continuous interconnecting channel morphology comprising at least three components, (a) wherein component A is selected from the group of polymers that are semicrystalline polymers and amorphous polymers, wherein the amorphous polymers have a shear modulus greater than about 8 MPa; (b) wherein component B is a polymer; (c) wherein components A and B are immiscible within each other and, if components A and B react after mixing, components A and B are immiscible prior to reaction; (d) wherein component C is a particle and a composition that has an ability to release $CO_2$.; (e) wherein the volume fraction of component A represents at least about 50% by volume of the total volume of components A, B and C; (f) wherein the preferential affinity between component B and component C is greater than between component A and component C; (g) wherein at least two phases are formed, one phase is composed of a majority of component A, and the second phase is composed of a majority of component B and a majority of component C; and (h) wherein the two phases form the co-continuous interconnecting channel morphology.

2 Claims, 3 Drawing Sheets

INTERCONNECTING CHANNEL MORPHOLOGY COMPOSITION FOR RELEASING CO₂

RELATED APPLICATIONS

The present application claims priority to U.S. Ser. No. 60/256,677, entitled Interconnecting Channel Morphology Composition For Releasing $CO_2$, filed Dec. 19, 2000.

FIELD OF THE INVENTION

The present invention is directed to compositions, which in a period of time release carbon dioxide ($CO_2$) gas. The invention may be used in caps and bottles used to contain carbonated beverages. Such bottles are known to not be impervious, and leak $CO_2$ over a period of time. In one embodiment, the composition has a co-continuous interconnecting channel morphology comprising three components—two polymers (i.e. components A and B) and a particle (i.e. component C) wherein the channels consist mainly of component B and the majority of component C resides in the channels.

BACKGROUND OF THE INVENTION

Carbonated soft drinks (CSD) bottles are often packaged in bottles constructed of PET. A non-exhaustive list of such beverages includes colas, seltzers, club soda, ginger ale, Tom Collins mix, root beers, lemon-lime flavored sodas, and a variety of other flavored sodas. At pressures near or below atmosphere, the $CO_2$ in these carbonated beverages escapes rapidly from solution. To keep a sufficient amount of $CO_2$ in solution, the soda is bottled under pressure. Keeping the $CO_2$ in solution is relatively important. Without it, the soda becomes flat, and these beverages would lose much of their appeal. Anecdotal evidence suggests that it is the carbonation that makes the beverages appealing. That is, the $CO_2$ present in the beverage provides a pleasing sensation in the palate. Accordingly, there is a need to insure that a sufficient amount of $CO_2$ remains in the beverage so that the consumer realizes full value for the product.

PET is the material of choice for forming bottles for carbonated beverages, due to its low cost, transparency, moldability, and relatively light weight. Also, its high level of impact resistance renders PET containers virtually unbreakable, a desired feature in a packaging material. However, the barrier properties of PET with respect to gases are somewhat suspect, and over time, $CO_2$ will leak through the container. Also, such containers are typically sealed by a cap having a base and a cylindrical skirt extending downward from the base. The cap has threads on the interior of the skirt, which are complimentary to threads on the container located near the container opening.

It is possible for the pressurized $CO_2$ to escape from the container in the neck region as well. Since it is possible that a beverage may sit in storage for an extended period of weeks, even months, between bottling and use by the consumer, a significant loss of $CO_2$ may arise. In one example, the shelf life of a 12 fluid ounce bottle is 8 weeks and 20 fluid ounce bottle is 16 weeks.

Furthermore, once the consumer opens the bottle, the $CO_2$ is rapidly released. In the case of large sized bottles, which hold a volume in excess of a single serving, it is expected that these bottles will be opened, closed after beverage is dispensed, and then opened at a later time to again dispense beverage. Eventually all of the $CO_2$ in the beverage will be released from the beverage rendering the remaining soda fizzless, a wholly insipid and undesirable state. The consumer is then left with two options, neither satisfactory, in which he or she can consume a flat beverage, or dump the remainder down the drain.

SUMMARY OF THE INVENTION

Figure 1:
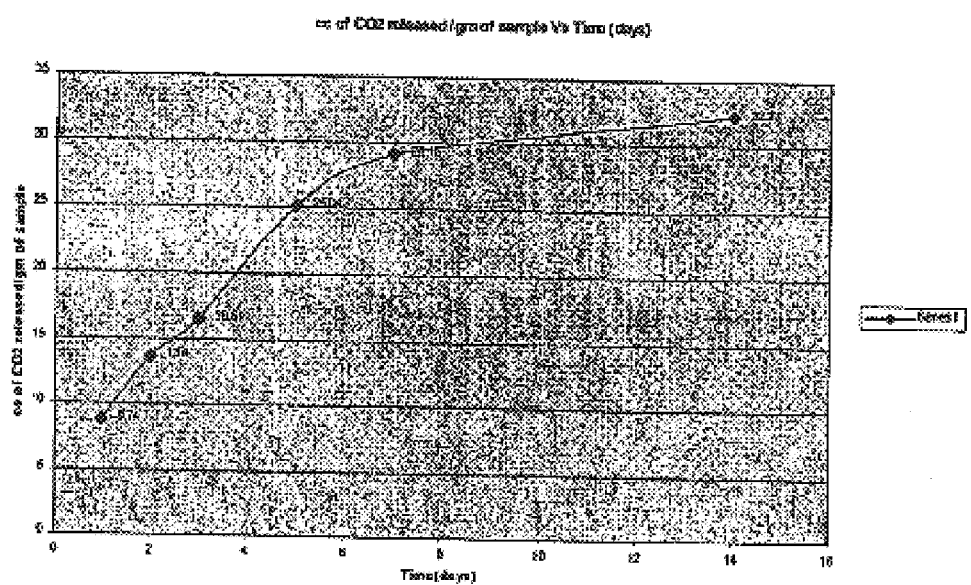
FIG. 1 is a graph that illustrates the results for $CO_2$ release for Example 1 and 2.

The present invention is a $CO_2$ releasing composition that can be incorporated into the packaging for carbonated beverages. In one embodiment, the composition contains a $CO_2$ releasing component. In another embodiment the composition is formed into a film. In yet another embodiment, the present invention is three phase moisture-activated polymer film that releases $CO_2$. In a further embodiment, this film can be incorporated into the inner seals of soda bottle cap easily and safely, so that in the presence of the water in the beverage the film releases $CO_2$. With this arrangement, there is always certain amount of carbon dioxide present inside the soda bottle due to the carbon dioxide releasing characteristics of the film, which can enhance the shelf life of the bottle significantly.

In another embodiment, the composition has a co-continuous interconnecting channel morphology comprising three components—two polymers (i.e. components A and B) and a particle (i.e. component C) wherein the channels consist mainly of component B and the majority of component C resides in the channels. Components A and B are generally immiscible within each other. In addition, one criteria for selecting component C and components A and B may be based on component C preferential affinity for component B over component A. Another criteria for selecting component C is based on the capacity of component C to release $CO_2$. In yet another embodiment, the $CO_2$ releasing component releases $CO_2$ when it come in contact with moisture, such as water, including water vapor.

DETAILED DESCRIPTION OF THE INVENTION

The releasing composition of the present invention is generally incorporated into a plastic. Therefore, in one embodiment, the releasing composition can be applied to the liner that is often placed on the bottom of the base of the cap, which faces into the bottle when the cap is fixed to the top of the bottle. The composition can be die cut to fit within the interior of the cap. The composition can be affixed to the interior liner of the cap by any known means, such as heat sealing, or by use of adhesives. In another embodiment, the liner may be coextruded. In a further embodiment, the composition can be formed into an induction seal, such has disclosed in U.S. Provisional Application No. 60/225,713, which is incorporated by reference herein. The composition can also be applied to the interior surface of the bottle. However, this may not be desirable, since the inclusion of the composition will render those locations nontransparent the region where the material is located.

In one embodiment, the composition comprises a co-continuous interconnecting channel morphology comprising at least three components, wherein: (a) component A is selected from the group of polymers that are semicrystalline polymers and amorphous polymers, wherein the amorphous polymers have a shear modulus greater than about 8 MPa; (b) component B is a polymer; (c) components A and B are immiscible within each other, and if components A and B react after mixing, components A and B are immiscible prior to reacting; (d) component C is a particle; (e) the volume fraction of component A represents at least about 50% by volume of the total volume of components A, B and C; (f) the preferential affinity between component B and component C is greater than between component A and component C; (g) at least two phases are formed, one phase is composed of a majority of component A, and the second phase is composed of a majority of components B and a majority of component C; and (h) two phases form the co-continuous interconnecting channel morphology.

Components A, B and C may be selected based on the desired end-use result—the desired end-use property. For example, component A may typically be selected based on its permeability properties (e.g. barrier properties), its chemical and/or temperature resistance properties, its molding properties, and/or its price (e.g. since it is the component having the largest volume fraction of the composition). Similarly, for example, component B may typically be selected based on its transport properties (e.g. desired transport of $CO_2$) and/or its preferential affinity with component C. Also, for example, component C is based on its ability to release $CO_2$. Consequently, a specific composition may be uniquely tailored and thus, uniquely optimized for a desired end-use application.

For example, one method of forming the composition of the present invention is by adding component C and component B to component A when component A is in a molten state; or before component A is in the molten state, so that components B and C may be blended and thoroughly mixed throughout component A to insure that the blend is uniformly mixed before reaching the melt phase. For example, such a technique may be useful when components A, B and C are all powders. In another embodiment, component B and component A are mixed prior to adding component C. Component B is either added before component A is in the molten state or after component A is in the molten state. For example, component C may be added to component A during the thermal process of forming sheets. After blending and processing, component B is drawn out into interconnecting channels that contain a percolation path in component A. The majority of component C resides in the interconnecting channels because of its preferential affinity towards component B over component A. In addition, the composition of the present invention may be described as "monolithic" because the composition does not consist of two or more discrete macroscopic layers.

For purposes of the present invention, the term "phase" means a portion of a physical system that is uniform throughout, has defined boundaries and, in principle, can be separated physically from other phases. The term "melting point" is defined as the first order transition point of the material determined by DSC. The term "not mutually soluble" means immiscible with each other. The term "immiscibility" means that the components of the blend are driven by thermodynamic forces to separate (i.e. demix) into two or more distinct phases that will coexist indefinitely under equilibrium conditions. An example is the separation of the oil-rich and water-rich phases in a salad dressing. For purposes of the present invention, "partial" immiscibility or "partial" miscibility is deemed "immiscible" and thus, any tendency for a component to phase separate from another component is deemed "immiscible." Immiscibility may be determined by the application of one or more forms of microscopy (e.g., optical, TEM, SEM or AFM) with an observation that the components are separated into two or more distinct phases. The term "particle" means a dispersed component that is either a crystalline or amorphous solid, or a crosslinked organic or inorganic material, and that retains its shape, aside from recoverable deformations, before, during, and after the blend is compounded in the molten state at elevated temperatures. This would include, e.g., a crosslinked polymer latex.

Further, for purposes of the present invention, the term "co-continuous interconnecting channel morphology" means that the minor phase (i.e., component B) is drawn out into interconnected channels that contain a percolation path, while simultaneously, the majority phase (i.e., component A) is percolating. "Percolation" means that there exists at least one unbroken path, composed only of points from within that phase, that will lead from any surface of a sample through the interior of the sample to any other surface. Such a percolation path provides a route for a desired object, such as a small molecule, an atom, an ion, or an electron, to be macroscopically transported across the sample while contacting only one of the phases. For some systems, the existence of an interconnecting channel morphology that is co-continuous may be determined by a minimum of two transport measurements that demonstrate percolation in both minor and major phases. Percolation theory is a mature branch of mathematics and physical science that is described in a variety of review articles, specialized monographs, and many introductory texts on stochastic processes, probability theory, and statistical mechanics. For example, an introductory treatment of percolation theory is described by D. Stauffer in *Introduction to Percolation Theory*, Taylor and Francis, (London 1985).

The term "preferential affinity" means that the particle (i.e., component C) has a lower interfacial energy when contacting one component than compared to contacting another component. A suitable method for determining "preferential affinity" for the present invention is the following:

(a) Blend the particle with the two components at elevated temperatures in their liquid state. Mix to achieve a macroscopically homogeneous dispersion.
 (b) Cool the mixture and allow to solidify.
 (c) Use a form of microscopy (e.g., TEM, SEM, and/or AFM) on a thin section to determine which of the two phases most closely contacts each particle in the field of view.
 (d) The component that is in the majority in the phase that contacts the largest number of particles is the component with "preferential affinity" for the particle.

Further, the term "shear modulus" is the ratio of a measured shear stress to the magnitude of a small, elastically recoverable, shear strain that is used to produce that stress. The criterion of greater than about 8 MPa refers to the shear modulus measured at room temperature. The "shear modulus" is determined by ASTM test method E143-87 (1998). The term "polymer" means a composition that is made by reacting two or more molecular species ("monomers") to form chemically-bonded larger molecules. The term "semicrystalline" means that the polymeric component, at ambient temperature, contains regions in which chain segments are packed with spatial registry into a periodic lattice and these regions are of sufficient size and extent to exhibit a detectable melting endotherm in a differential scanning calorimetry (DSC) measurement. The term "amorphous" means that the polymeric component, at ambient temperature, either contains no regions of periodic packing of segments, or such regions are undetectable with a DSC measurement.

With respect to component A, in one embodiment, component A may be a thermoplastic material. Examples of suitable thermoplastic materials may include polyolefins such as polypropylene and polyethylene, polyisoprene, polybutadiene, polybutene, polysiloxane, polycarbonates, polyamides, ethylene-vinyl acetate copolymers, ethylene-methacrylate copolymer, poly(vinyl chloride), polystyrene, polyesters, polyanhydrides, polyacrylianitrile, polysulfones, polyacrylic ester, acrylic, polyurethane and polyacetal, or copolymers or mixtures thereof.

In one embodiment, component "B" may be either an oxide such as ethylene oxide or a polymer such as acrylic or a combination thereof. The loading of component "B" may range from about 10% to 20%, 20% to 40% and 40% to 60% by weight with respect to the polymer.

In yet a further embodiment, the $CO_2$ releasing component may be a carbon and oxygen containing salt of an alkali or alkaline earth metal, such as the carbonates of sodium, potassium, magnesium, or calcium. Bicarbonates of the same may also be employed. In yet a further embodiment, the $CO_2$ releasing component is calcium carbonate. In yet a further embodiment, the $CO_2$ releasing component may be baking powder. Mixtures of $CO_2$ releasing components are also possible. In an embodiment, the $CO_2$ releasing material loading level can range from about 10% to 20%, 20% to 40% and 40% to 60% by weight with respect to the polymer.

In another embodiment, the $CO_2$ releasing component may be a combination of a carbonate such as, but not limited to, sodium bicarbonate and/or calcium carbonate with an acid. Suitable acids include, but are not limited to, citric acid, maleic acid, malic acid, fumaric acid, polyacrylic acid, oxalic acid and/or mixtures thereof. In one specific embodiment, the acid can be used in an anhydrous form to prevent the reaction from occurring prematurely. In yet another embodiment, to reduce the possibility of the reaction initiating prematurely, the acid is in its solid granular form and is substantially free of moisture. In yet a further embodiment, the $CO_2$ releasing component may be combined with the plastic component without the employing the co-continuous interconnecting channel morphology comprising at least three components discussed above. In one example, this can be used when one desires to slow down the $CO_2$ release.

In a further embodiment, the acid particles may be employed as component "C" in creating co-continuous interconnecting channel morphology comprising at least three components. Consequently, in this embodiment, the composition should be processed at a temperature below the melt temperature of the acid so that the acid remains in its particle form.

In yet another embodiment, the acid can be selected with a low molecular weight and thus, will allow multiple H+ions to be released per mole of the compound. In this way, less acid by weight may be used to achieve substantial completion of the chemical reaction. It is also understood that particle size of the acid and/or carbonate can affect the efficiency of the reaction. For example, a particle size in the range of about 1 micron for calcium carbonate can be employed.

The following are merely illustrative examples of various compositions of the present invention. It is understood that these are merely illustrative examples and are not meant to limit the present invention.

| Materials | Wt percentage |
|---|---|
| CaCO$_3$ | 40.00% |
| PolyOx 750 | 3.00% |
| Carbopol 934 p-nf | 30.00% |
| EXACT 4023 | 27.00% |
| CaCO$_3$ | 40.00% |
| PolyOx 750 | 3.00% |
| Carbopol 934 p-nf | 20.00% |
| EXACT 4023 | 37.00% |
| B1H4E Resin (Hekal) | 95.00% |
| PolyOx 750 | 5.00% |
| CaCO$_3$ | 50.00% |
| Luviskol VA64 | 7.00% |
| Carbopol 971 P-NF | 13.00% |
| EXACT 4023 | 30.00% |
| CaCO$_3$ | 40.00% |
| Luviskol VA64 | 10.00% |
| Molecular Sieve 4A | 15.00% |
| EXACT 4023 | 35.00% |
| NaHCO$_3$ | 35.00% |
| PolyOx 750 | 5.00% |
| Carbopol 971 P-NF | 25.00% |
| EXACT 4023 | 35.00% |
| NaHCO$_3$ | 32.00% |
| Citric Acid | 28.00% |
| PolyOx 750 | 5.00% |
| EXACT 4023 | 35.00% |
| CaCO$_3$ | 40.00% |
| PolyOx 750 | 5.00% |
| Carbopol 971 P-NF | 25.00% |
| EXACT 4023 | 30.00% |
| NaHCO$_3$ | 37.00% |
| Malic Acid | 37.00% |
| PolyOx 750 | 5.00% |
| EXACT 4023 | 21.00% |
| NaHCO$_3$ | 50.00% |
| Malic Acid | 25.00% |
| PolyOx 750 | 5.00% |
| EXACT 4023 | 20.00% |
| NaHCO$_3$ | 37.00% |
| Malic Acid | 37.00% |
| PolyOx 750 | 5.00% |
| FT120WV3 | 21.00% |
| NaHCO$_3$ | 37.00% |
| Malic Acid | 37.00% |
| PolyOx 750 | 5.00% |
| Tl 4040G | 21.00% |
| NaHCO$_3$ | 37.00% |
| Malic Acid | 37.00% |
| PolyOx 750 | 5.00% |
| Dowlex 2045A | 21.00% |
| NaHCO$_3$ | 37.00% |
| Malic Acid | 37.00% |
| PolyOx 750 | 5.00% |
| Elvax 3185 | 21.00% |
| NaHCO$_3$ | 37.00% |
| Malic Acid | 37.00% |
| PolyOx 750 | 5.00% |
| 4006 | 21.00% |
| NaHCO$_3$ | 37.00% |
| Malic Acid | 37.00% |
| PolyOx 750 | 5.00% |
| Engage 4006 | 21.00% |
| NaHCO$_3$ | 37.00% |
| Malic Acid | 37.00% |
| 15-200 | 5.00% |
| EXACT 4023 | 21.00% |
| NaHCO$_3$ | 37.00% |
| Malic Acid | 37.00% |
| Luviskol Va64 | 5.00% |
| EXACT 4023 | 21.00% |
| NaHCO$_3$ | 50.00% |
| PolyOx 750 | 7.00% |
| EXACT 4023 | 43.00% |

-continued

| Materials | Wt percentage |
|---|---|
| NaHCO₃ | 45.00% |
| Silica Grade 11 | 15.00% |
| PolyOx 750 | 7.00% |
| EXACT 4023 | 33.00% |
| NaHCO₃ | 37.00% |
| Malic Acid | 37.00% |
| Pluronic F108 | 5.00% |
| EXACT 4023 | 21.00% |
| NaHCO₃ | 45.00% |
| Silica Grade 11 | 15.00% |
| Pluronic F108 | 5.00% |
| EXACT 4023 | 35.00% |
| NaHCO₃ | 40.00% |
| Silica Grade 11 | 30.00% |
| PolyOx 750 | 5.00% |
| EXACT 4023 | 25.00% |
| Calcium Carbonate | 40.00% |
| Silica Grade 11 | 30.00% |
| PolyOx 750 | 5.00% |
| EXACT 4023 | 25.00% |
| Calcium Carbonate | 45.00% |
| Silica Grade 11 | 15.00% |
| Pluronic F108 | 5.00% |
| EXACT 4023 | 35.00% |
| Calcium Carbonate | 37.00% |
| Citric Acid | 31.00% |
| Ca(OH)2 | 6.00% |
| PolyOx 750 | 5.00% |
| EXACT 4023 | 21.00% |
| Calcium Carbonate | 37.00% |
| Malic Acid | 37.00% |
| Pluronic F108 | 5.00% |
| EXACT 4023 | 21.00% |
| NaHCO₃ | 35.00% |
| Malic Acid | 35.00% |
| PolyOx 750 | 10.00% |
| EXACT 4023 | 20.00% |
| NaHCO₃ | 37.00% |
| Malic Acid | 37.00% |
| EXACT 4023 | 26.00% |
| CaCO₃ | 35.00% |
| Malic Acid | 38.90% |
| PolyOx 750 | 5.00% |
| EXACT 4023 | 21.10% |
| CaCO₃ | 35.00% |
| Malic Acid | 38.90% |
| PolyOx 750 | 5.00% |
| PP 3505 | 21.10% |
| CaCO₃ | 35.00% |
| Citric Acid | 37.10% |
| PolyOx 750 | 5.00% |
| EXACT 4023 | 22.90% |
| CaCO₃ | 35.00% |
| Citric Acid | 37.10% |
| PolyOx 750 | 5.00% |
| PP 3505 | 22.90% |
| CaCO₃ | 35.00% |
| Malic Acid | 38.90% |
| PP 3505 | 26.10% |
| CaCO₃ | 35.00% |
| Citric Acid | 37.10% |
| PP 3505 | 27.90% |
| CaCO₃ | 37.00% |
| Citric Acid | 31.00% |
| PolyOx 750 | 5.00% |
| Calcium Hydroxide (anhydrous) | 6.00% |
| EXACT 4023 | 21.10% |

EXAMPLE 1

In one embodiment, a suitable composition for a three-phase polymer film is set forth below. All compositions are set forth on a mass/mass basis.

| | Manufacturer | Product Number |
|---|---|---|
| Type (component "A") | | |
| 27% Ethylene-Olefin Copolymer | Exxon Chemical Company | 4023 |
| Type (component "B") | | |
| 3% Ethylene oxide | Union Carbide Corporation | WSRN750 |
| 30% Acrylic Polymer | BF Goodrich | 934PNF |
| Type (component "C") | | |
| 40% CaCO₃ | Sigma-Aldrich Chemical Company | 202932 |

The calcium carbonate is included in the composition in particulate form. All sample components are solid phase. The above-mentioned formulation was hand mixed. The processing of formulation was done using a single screw extruder. The temperature profile across the extruder was maintained at 250° F. The single screw extruder was primed/purged with Exact 4023. The formulation was then added to the extruder through the hopper. About 5 grams of extrudate was then collected coming out of the die.

The collected extrudate was placed in between the two platen of the compression press and it was gently squeezed at 5000 psi and for about 10 seconds. Thickness of the sample was maintained by means of shims. The sample was then quenched. The final circular shape weighing 1 gram having an inch diameter and 0.065-inch thickness was cut by means of circular stamp. The circular shapes can be fixed to the cap liner in the way previously discussed.

EXAMPLE 2

Sample Vials

A total of 90 vials were used for the $CO_2$ release study. 55 vials, used as controls, were purged with nitrogen. The other 35 vials (replicate for each time frame) were set up for $CO_2$ release test. Vial volume 120 cc. The vials are made of glass. The vials had crimped aluminum seals with red rubber septa in it.

Test Conditions

Temperature in the room in which testing was done was maintained between 22–23° C. Each vials had half a piece of round 90 mm diameter filter paper, moist with 500μL of water. Each vial had sample inside it. The lid of the vial was crimped tight after putting the sample and the filter paper inside it. The test was run over a period of 4 weeks.

Sample Weight

The samples were composed of the composition of Example 1. All samples of the $CO_2$ releasing composition were weighed prior to the placement into the vial. Approximately 0.5 to 1.0 grams of sample was used for the experiment.

$CO_2$ Release Measurement

A MOCON PAC CHECK-650 Dual Head Space Analyzer device was used to measure the amount of carbon dioxide released by the sample. This analyzer employs an IR source and IR detector in the determination of the amount of $CO_2$ present at the time the sample is inspected.

The % carbon dioxide released by the sample was measured after 1 day, 2 days, 3 days, 5 days, 7 days, 14 days, 28 days duration. The 55 control vial samples (5 replicates for each time period) are checked at 1 hr, 2 hr, 4 hr, 8 hr, 24 hr, 2 days, 4 days, 7 days, 14 days, 21 days and 28 days for percent of oxygen inside the vials or leakage through the vial.

Samples were removed from the vial and inserted into the MOCON instrument to detect the amount of $CO_2$ present in the following manner. A10 cc gas tight syringe was used. The syringe was emptied by pushing the plunger all the way in. The syringe needle was inserted through the rubber septa located in the lid of the aluminum-crimped seal. The syringe plunger was slowly pulled out until a gas sample of 5 cc or more is in the syringe. The needle was inserted into the injection filter assembly on the front panel of the PAC CHECK 650 until the needle will not go any further. The syringe plunger was pushed to inject the sample into the PAC CHECK 650 at a rate of approximately 1 cc/second. As the sample is injected, the readouts on the MOCON instrument for the $CO_2$ and $O_2$ display are checked to insure the device is operating properly. These indicate that the sample was properly injected into the PAC CHECK 650. The Concentration of Oxygen and Carbon dioxide is displayed in the front panel in %.

The control sample vials were filled with nitrogen. These vials are checked at above-mentioned time for percent of oxygen inside the vials or leakage through the vial. The % carbon dioxide in the room atmosphere was measured at the beginning of the experiment. The % carbon dioxide released by the sample was measured at selected intervals. The volume of the air inside the vial was calculated by filling the vial with water and weighing it after tarring the vial weight with filter paper and sample inside it. The difference in the % $CO_2$ reading was converted to the volume of the $CO_2$ released based on the vial volume. Then based on the weight of the sample the equivalent volume of $CO_2$ released/gm of the sample was calculated after implying a correction factor for the increase in pressure inside the vial.

Results

Figure 2:
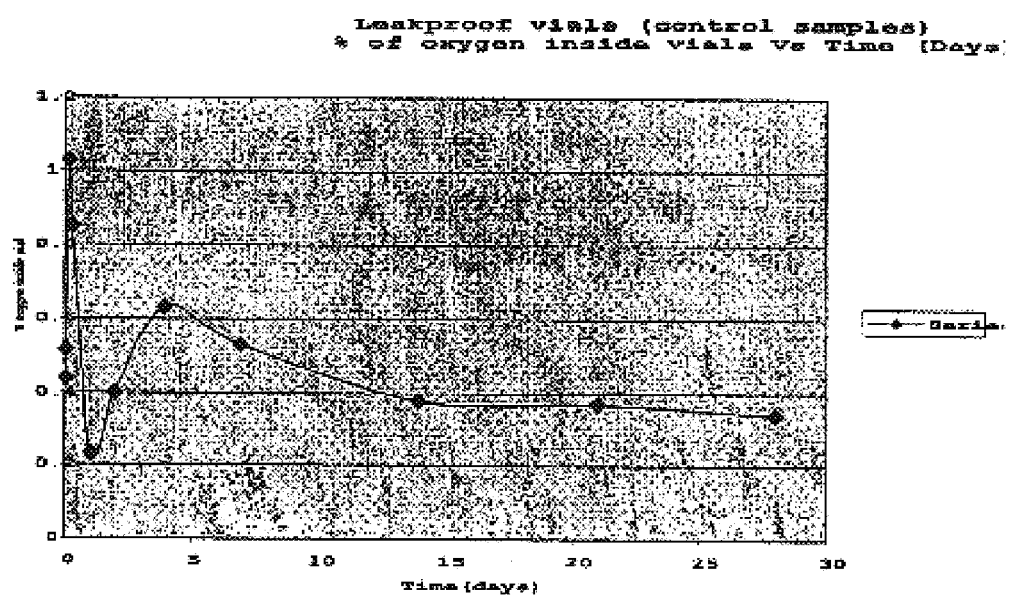
FIG. 2 is a graph that illustrates the results for the leakage test for the control samples for Examples 1 and 2.

The result of the leakage test for control samples is shown in FIG. 2.

The data collected for the carbon dioxide release is summarized in Table 1.

The FIG. 1 represents the results for $CO_2$ release.

The data show that the amount of $CO_2$ released/gm of the sample is −32.27 cc based on 14 days data.

Findings

The data show that the CSP $CO_2$ releaser film has the capacity of:

TABLE 1

| Time (Days) | CC of $CO_2$ released/gm of sample |
| --- | --- |
| 1 | 8.74 |
| 2 | 13.60 |
| 3 | 16.51 |
| 5 | 25.04 |
| 7 | 29.15 |
| 14 | 32.27 |
| 28 | Due |

EXAMPLE 3

Figure 3:
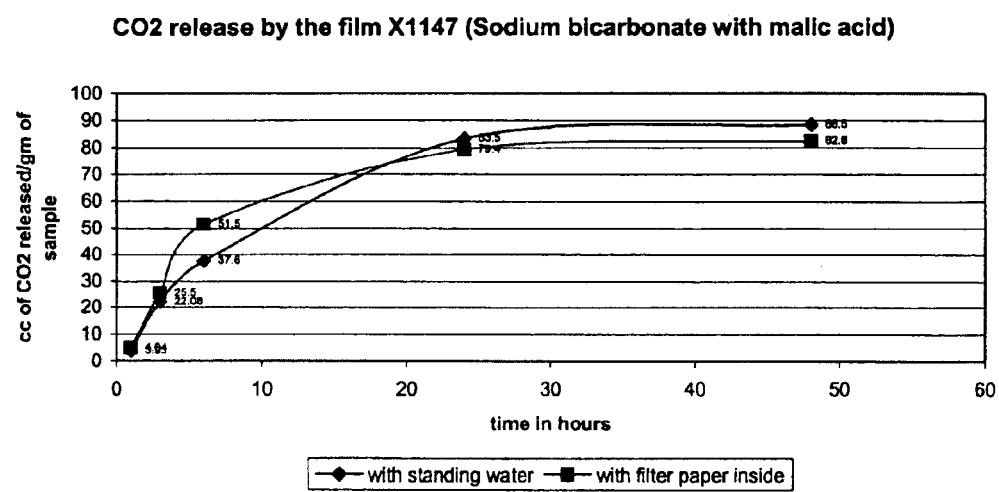
FIG. 3 is a graph that illustrates the results for Example 3.

The following various $CO_2$ releasing compositions illustrating the present invention. The table also shows the releasing profiles with various acids. FIG. 3 is a graph showing these releasing profiles.

| Jan. 15, 2001 Ratio of NaHCO3: acid = 5:1 | CO2 release in 48 hours by actives (with moist filter paper) | cc of CO2 released/gm of active NAHCO3 | cc of CO2 released/gm of active CaCO3 (larger particle size) |
| --- | --- | --- | --- |
| citric acid | 24 hours | 70.05 | 34.28 |
|  | 48 hours | 83.22 | 43.23 |
| maleic acid | 24 hours | 56.6 | 52.83 |
|  | 48 hours | 65.01 | 39.12 |
| malic acid | 24 hours | 78.23 | 39.64 |
|  | 48 hours | 75.61 | 33.64 |
| fumaric acid | 24 hours | 55.94 | 7.14 |
|  | 48 hours | 81.23 | 10.05 |
| carbopol(polyacrylic acid) | 24 hours | 30.09 | 12.5 |
|  | 48 hours | 39.42 | 4.59 |

What is claimed:

1. A $CO_2$ releasing composition that can be incorporated into the packaging for carbonated beverages having a co-continuous interconnecting channel morphology comprising at least three components, (a) wherein component A is selected from the group of polymers that are semicrystalline polymers and amorphous polymers, wherein the amorphous polymers have a shear modulus greater than about 8 MPa;

(b) wherein component B is a polymer;

(c) wherein components A and B are immiscible within each other and, if components A and B react after mixing, components A and B are immiscible prior to reaction;

(d) wherein component C is a particle and a composition that has an ability to release $CO_2$.;

(e) wherein the volume fraction of component A represents at least about 50% by volume of the total volume of components A, B and C;

(f) wherein the preferential affinity between component B and component C is greater than between component A and component C;

(g) wherein at least two phases are formed, one phase is composed of a majority of component A, and the second phase is composed of a majority of component B and a majority of component C; and (h) wherein the two phases form the co-continuous interconnecting channel morphology.

2. A $CO_2$ releasing composition that can be incorporated into the packaging for carbonated beverages comprising a $CO_2$ releasing component comprising a combination of a carbonate with an acid.

* * * * *